United States Patent
Liang et al.

(10) Patent No.: US 9,111,003 B2
(45) Date of Patent: *Aug. 18, 2015

(54) SCALABLE DERIVATIVE SERVICES

(75) Inventors: Sheng Liang, Cupertino, CA (US);
Oliver Chang, Palo Alto, CA (US);
Hong Zhang, Sunnyvale, CA (US);
Abhishek Chauhan, Los Gatos, CA (US); Rajiv Mirani, Los Gatos, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/846,663

(22) Filed: Jul. 29, 2010

(65) Prior Publication Data
US 2011/0041053 A1 Feb. 17, 2011

Related U.S. Application Data

(63) Continuation of application No. 09/767,365, filed on Jan. 22, 2001, now Pat. No. 7,793,220.

(60) Provisional application No. 60/228,904, filed on Aug. 29, 2000.

(51) Int. Cl.
*G06F 17/00* (2006.01)
*G06F 17/30* (2006.01)
*G06F 17/22* (2006.01)
*G06F 17/25* (2006.01)

(52) U.S. Cl.
CPC ...... *G06F 17/3089* (2013.01); *G06F 17/30902* (2013.01); *G06F 17/2288* (2013.01); *G06F 17/25* (2013.01)

(58) Field of Classification Search
CPC . G06F 17/25; G06F 17/2288; G06F 17/3089; G06F 17/30902
USPC ......... 715/735–739, 757, 854, 241, 523, 511, 715/530, 253, 273, 234–237, 774–778
See application file for complete search history.

(56) References Cited

U.S. PATENT DOCUMENTS

| | | | |
|---|---|---|---|
| 5,860,073 A | 1/1999 | Ferrel et al. | |
| 5,983,227 A | 11/1999 | Nazem et al. | |
| 6,029,175 A | 2/2000 | Chow et al. | |
| 6,044,398 A | 3/2000 | Marullo et al. | |
| 6,178,461 B1 | 1/2001 | Chan et al. | |
| 6,185,701 B1 * | 2/2001 | Marullo et al. | 714/38.14 |
| 6,311,269 B2 | 10/2001 | Luckenbaugh et al. | |
| 6,366,933 B1 | 4/2002 | Ball et al. | |
| 6,397,253 B1 | 5/2002 | Quinlan et al. | |

(Continued)

OTHER PUBLICATIONS

Sun et al. "Virtual Proxy Servers for WWW and Inteligent Agents on the Internet" Published 1997 by IEEE pp. 200-209.*

*Primary Examiner* — Quoc A Tran
(74) *Attorney, Agent, or Firm* — Foley & Lardner LLP; Christopher J. McKenna; Shabbi S. Khan (57) ABSTRACT

An efficient method for parsing HTML pages identifies pages containing a mix of static and dynamic content. The pages are parsed to form abstract syntax trees (ASTs), which are then cached along with the pages. When a later version of a page is retrieved, it is compared against the cached version, and only those portions of the AST that contain different content are reparsed.

20 Claims, 8 Drawing Sheets

(56) References Cited

U.S. PATENT DOCUMENTS

| | | |
|---|---|---|
| 6,424,979 B1 | 7/2002 | Livingston et al. |
| 6,430,624 B1 * | 8/2002 | Jamtgaard et al. ............ 709/246 |
| 6,596,030 B2 | 7/2003 | Ball et al. |
| 6,605,120 B1 | 8/2003 | Fields et al. |
| 6,658,624 B1 | 12/2003 | Savitzky et al. |
| 6,718,361 B1 | 4/2004 | Basani et al. |
| 6,725,425 B1 | 4/2004 | Rajan et al. |
| 6,785,902 B1 | 8/2004 | Zigmond et al. |
| 7,013,323 B1 | 3/2006 | Thomas et al. |
| 7,047,281 B1 | 5/2006 | Kausik |
| 7,200,804 B1 | 4/2007 | Khavari et al. |
| 7,284,274 B1 | 10/2007 | Walls et al. |
| 7,287,243 B2 | 10/2007 | Dollin et al. |
| 2002/0004813 A1 | 1/2002 | Agrawal et al. |
| 2002/0042720 A1 | 4/2002 | Taylor et al. |
| 2002/0099738 A1 | 7/2002 | Grant |
| 2002/0120648 A1 * | 8/2002 | Ball et al. ...................... 707/511 |
| 2002/0138511 A1 | 9/2002 | Psounis et al. |
| 2003/0018612 A1 | 1/2003 | Melbin |
| 2003/0074634 A1 | 4/2003 | Emmelmann |
| 2004/0199575 A1 | 10/2004 | Geller |
| 2005/0188270 A1 | 8/2005 | Dollin et al. |
| 2005/0246635 A1 | 11/2005 | Hirose et al. |
| 2006/0242145 A1 * | 10/2006 | Krishnamurthy et al. ........ 707/6 |
| 2008/0046826 A1 * | 2/2008 | Nazem et al. ................. 715/744 |

\* cited by examiner

SCALABLE DERIVATIVE SERVICES

RELATED APPLICATIONS

The present application claims priority to U.S. patent application Ser. No. 09/767,365 entitled "Scalable Derivative Services" filed on Jan. 22, 2001 which claims priority from U.S. Provisional Application No. 60/228,904, filed on Aug. 29, 2000, both of which are incorporated herein by reference in their entirety. The present application is also related to U.S. patent application Ser. No. 09/687,997, filed on Oct. 13, 2000, which is also incorporated herein by reference in its entirety.

BACKGROUND OF THE INVENTION

1. Field of Invention

The invention relates to improved parsing and manipulation of data such as a markup language.

2. Description of the Related Art

With the increased popularity of web-hosted services and applications, portals and other Service Providers (SPs) have begun to offer hosted applications that enhance, or even replace, traditional desktop applications. For example, it is increasingly more common to compute one's taxes, pay bills, and manage daily appointments and e-mails via the World Wide Web, instead of through traditional locally-installed software applications.

Along with this growth, there is an accompanying need for derivative services that leverage and integrate existing web-hosted services, allowing end users to access data obtained from multiple services and presented in a single page or set of pages.

Building derivative services for applications hosted across various domains poses new challenges compared with building services such as search engines and shopping comparison sites. Search engines and shopping comparison sites handle web pages that need not be specific to individual users and can remain static for a sizeable period of time, since content may often remain unchanged for hours, days or even weeks at a time. In contrast, derivative services for hosted applications must deal with highly dynamic and personalized web pages. For example, it would not be at all desirable for old e-mail to be redelivered, or for new e-mail to be substantially delayed because of a service that was slow to update. These derivative services should therefore interact with hosted applications on behalf of the end user in real time.

To provide derivative services, there is a difficulty of having to scale the number of virtual browsers, which establish connections from a derivative services provider (DSP) to primary web servers to retrieve content on a user's behalf, to the number of concurrent users of the DSP. Traditional browsers are designed for desktop use, and typically require several megabytes of memory to run. Virtual browsers are not being run on the users' machines, but instead are being executed by the DSP. As a result, content retrieved by a virtual browser may not even be displayed on any screen, but instead just passed to another system for further processing. If a separate virtual browser were instantiated on a DSP server for each end user, the resulting tax on the server's processor and memory could quickly become overwhelming. However, in order to provide the kind of derivative services discussed above in which existing web-hosted services from primary servers are integrated and delivered simultaneously, there is a need for multiple virtual browsers to operate simultaneously on the DSP side. This problem, i.e. the need for multiple virtual browsers and the difficulty in providing them, has been an obstacle to the growth of the derivative services area.

Accordingly, what is needed is a system and method for providing scalable derivative services that avoids the processing and memory drain present in current implementations.

BRIEF SUMMARY OF THE INVENTION

The present invention efficiently parses HTML content (or other markup or content language such as DHTML, Java, etc.) by identifying data files (e.g. pages) that contain some unchanging (static) content, but still vary to some degree with each new version. Once these pages are retrieved and identified, they are parsed to form an abstract syntax tree (AST), and the pages and their associated ASTs are then cached. When a new version of a page that already is stored in the cache is retrieved, the new version of the page is compared to the stored version to determine which portions of the new version contain new content. Nodes of the AST corresponding to content that does not vary between the versions of the page are identified as static nodes; the remaining content is deemed to be dynamic content. Once the dynamic content of the page has been identified, it is parsed to form dynamic AST nodes, which may be combined with the cached static nodes to form a complete AST. Since only the portions of the new version of the page corresponding to dynamic content are reparsed, computation time and memory are thereby saved. This enables a larger number of virtual browsers, which jointly access the ASTs, to be used in a derivative server, which can use the ASTs and associated pages to deliver derivative services to many remote clients.

DETAILED DESCRIPTION OF PREFERRED EMBODIMENTS

The present invention includes a system and method for providing derivative services on a scalable basis to a large number of users simultaneously by taking advantage of the fact that often, only a small portion of a page changes each time the page is retrieved for display to a user. By only parsing those portions of a web page that are dynamic, i.e., that change from instance to instance, significant memory and CPU processing time can be saved. This allows for increased scalability of the virtual browsers and reduced memory requirements compared to present day systems, consequently enabling service to a greater number of simultaneous users.

Figure 1:
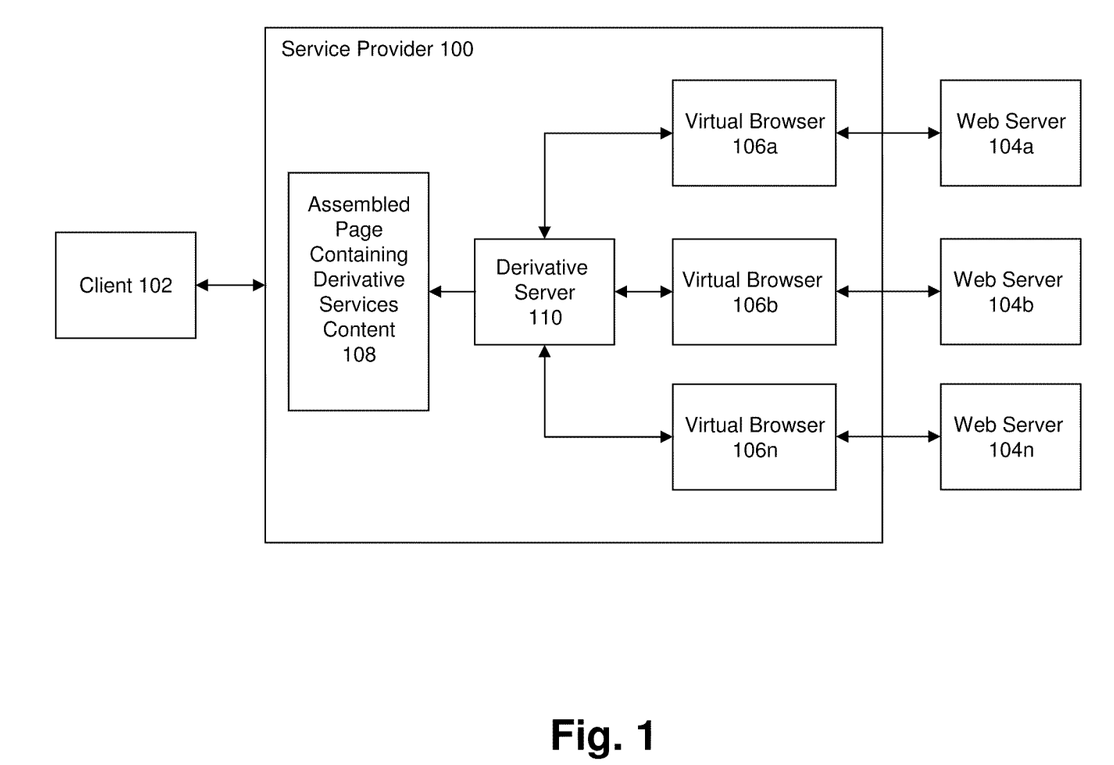
FIG. 1 is an illustration of one way in which derivative services are provided by a service provider to a client.

Referring now to FIG. 1, there is shown an illustration of how derivative services are provided by a derivative service provider (DSP) 100 to a client 102.

The DSP 100 gathers content from a plurality of web servers 104 and uses a derivative server 110 to combine the content to produce a page 108 (or set of pages) for the client 102. (One client is shown, but in practice, the DSP 100 will maintain concurrent connections with thousands of clients 102, providing the described functionality for each.) The client 102 does not access each web server 104 directly, but rather obtains an assembled page 108 from the DSP 100 after sending it a request for a page. In many cases, the requested page does not exist on any one server 104, but rather is constructed by the derivative server 110 from multiple pages from different web servers 104. Each web server 104 is accessed by a virtual browser 106 belonging to the DSP 100. Since a typical browser such as Microsoft's Internet Explorer or Netscape's Navigator can easily require several megabytes of memory to execute, there is a high cost to simultaneously executing a large number of virtual browsers. For a DSP 100 to serve hundreds or thousands of clients 102 simultaneously, with each client 102 requiring a different dedicated virtual browser 106 for each site 104 forming part of that client's assembled page 108, the DSP 100 would have to have hundreds or thousands of virtual browsers simultaneously available, with the memory and processing power available to support them.

Figure 2:
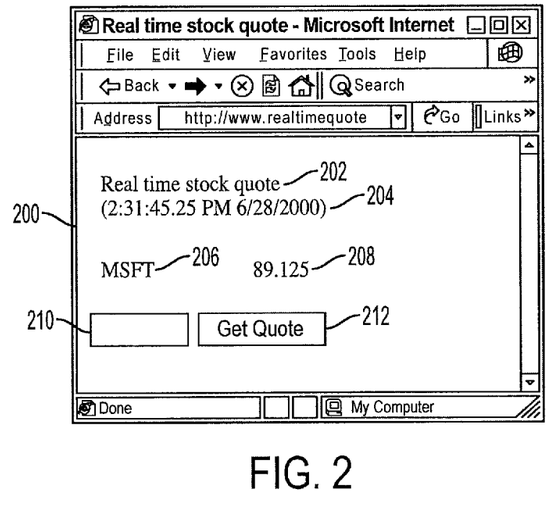
FIG. 2 is a screen shot of an HTML page displaying a real time stock quote.

One of the reasons the virtual browsers 106 require so much available memory is that they typically parse every page they retrieve. Parsing is a memory intensive activity because it requires the use of data structures such as tables or trees. One method of parsing involves building an abstract syntax tree (AST). To illustrate the formation of an AST, consider FIG. 2, which depicts a web page 200 that provides a real time stock quote. The page comprises a title portion 202, a time stamp 204, a ticker symbol 206, a price 208, a text entry box 210, and a "Get Quote" button 212. The HTML code for such a page might resemble the following:

```
<html>
<head>
<title>Real time stock quote</title>
</head>
<body>
Real time stock quote <br>
(2:31:45.25 PM 6/28/2000)
<p>
<table border=0>
    <tr bgcolor='#dddddd'>
        <td width=100>MSFT</td>
        <td width=57 >89.125</td>
    </tr>
</table>
<p>
<form action="quote.html">
    <input type="text" name="symbol" size="8">
    <input type="submit" name="submit" value="Get Quote">
</form>
</body>
</html>
```

Figure 3:
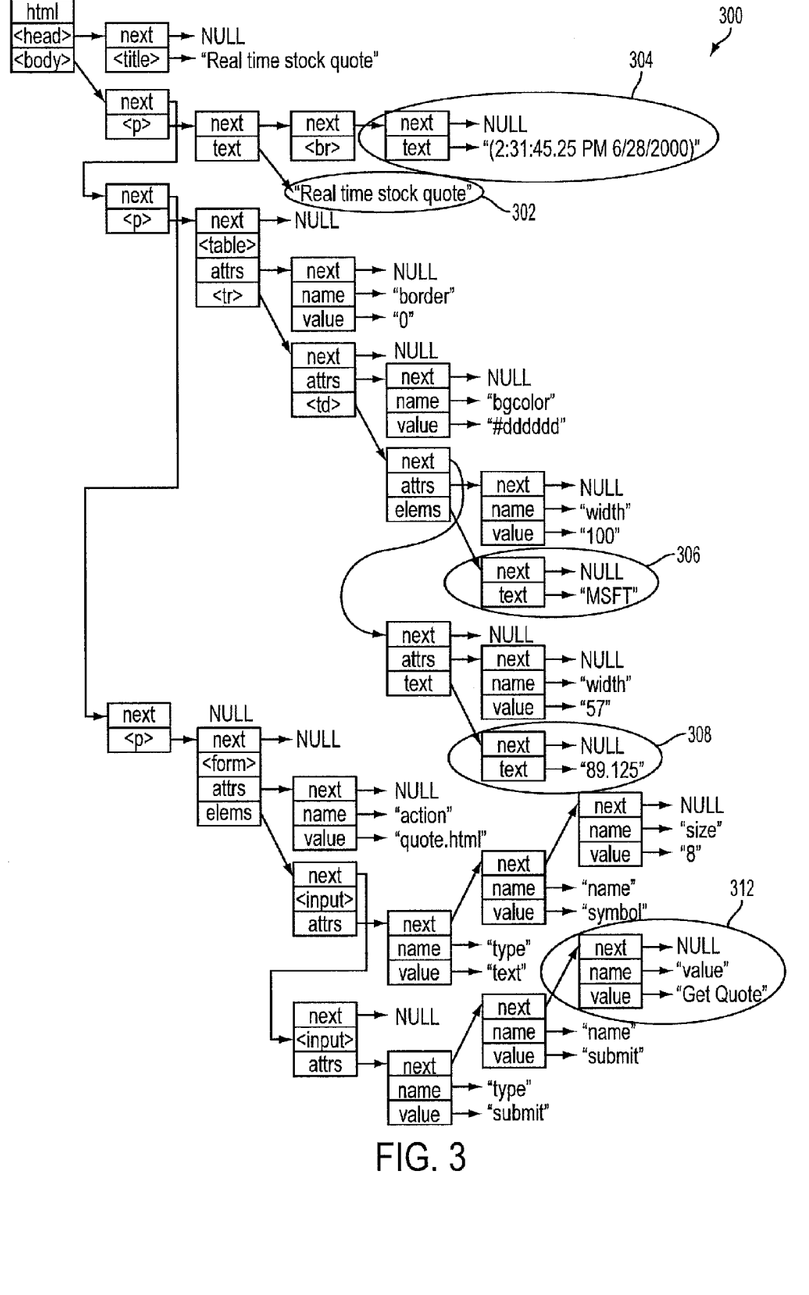
FIG. 3 is an illustration of an abstract syntax tree built from the HTML page of FIG. 2.

An AST built from this page is illustrated in FIG. 3. The AST 300 comprises various nodes, including nodes corresponding to the title banner 302, the time stamp 304, the stock ticker symbol 306, the stock price 308, and the "Get Quote" button 312. As FIG. 3 illustrates, the resulting AST 300 that is produced is large, compared to the small amount of HTML code used to build the page.

The present invention enables derivative services that overcome the excessive memory and processor requirements of existing systems by taking advantage of the fact that much of the content in a given content page remains static over time. By determining which portions of a page are static, and which are dynamic, the present invention provides the ability to parse only the dynamic content, therefore reducing the memory and processing time required by the virtual browsers, and thus increasing the number of virtual browsers that can be run concurrently by a DSP.

Returning to the stock quote page described above with respect to FIG. 2, most of the page is static, and only a small portion is dynamic. The title 202, text entry box 210, and "Get Quote" button 212 are static elements of the page 200, in that they do not typically vary each time the page 200 is retrieved. Conversely, the time stamp 204, stock ticker symbol 206, and stock price 212 are dynamic, and would be expected to vary.

Figure 4:
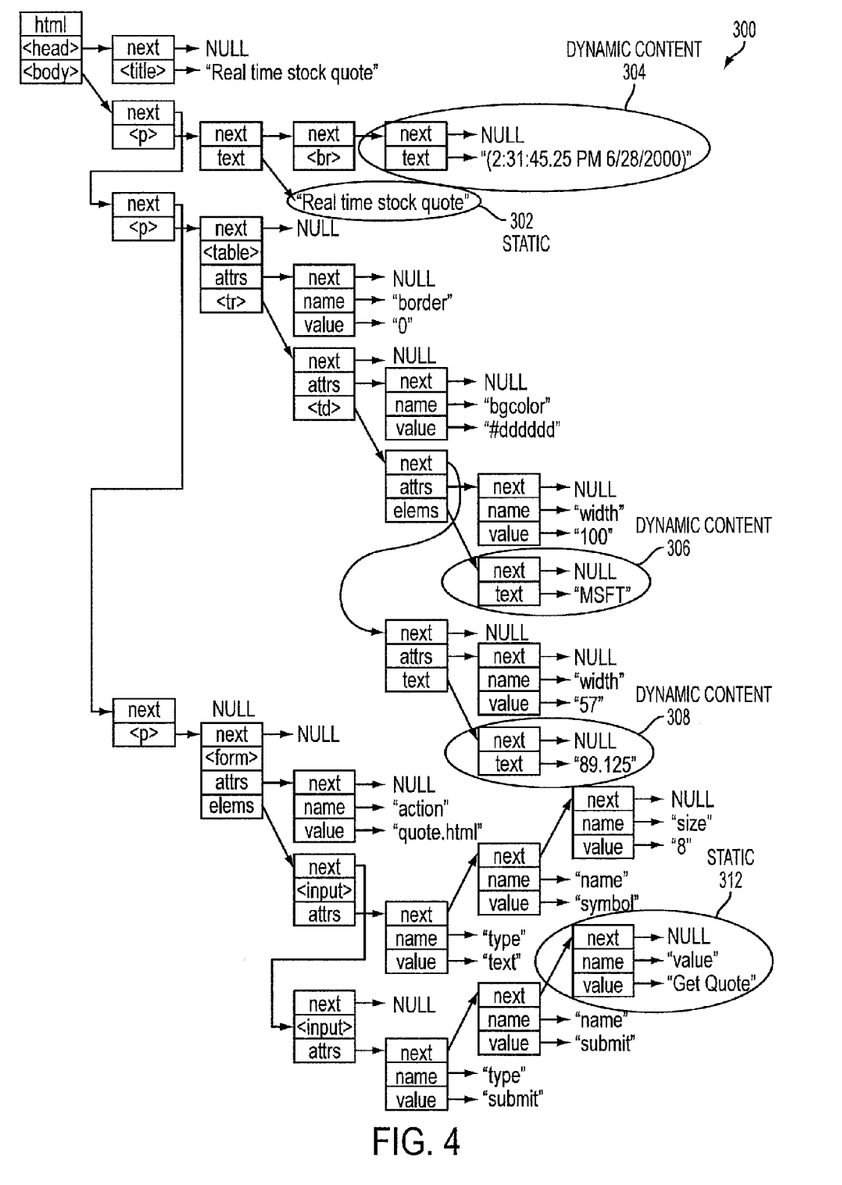
FIG. 4 is an illustration of the dynamic content present in the abstract syntax tree of FIG. 3.

Referring now to FIG. 4. there is shown the AST 300 described earlier with respect to FIG. 3. FIG. 4 illustrates that nodes 304, 306, and 308 are dynamic, while the remaining nodes, including nodes 302 and 312 are static. As can be seen from FIG. 4, the dynamic portion of the AST 300 is small compared to the overall size of the AST. Thus, it would be desirable if the entire page, containing mostly static content, did not have to be reparsed every time the page is fetched.

Figure 5:
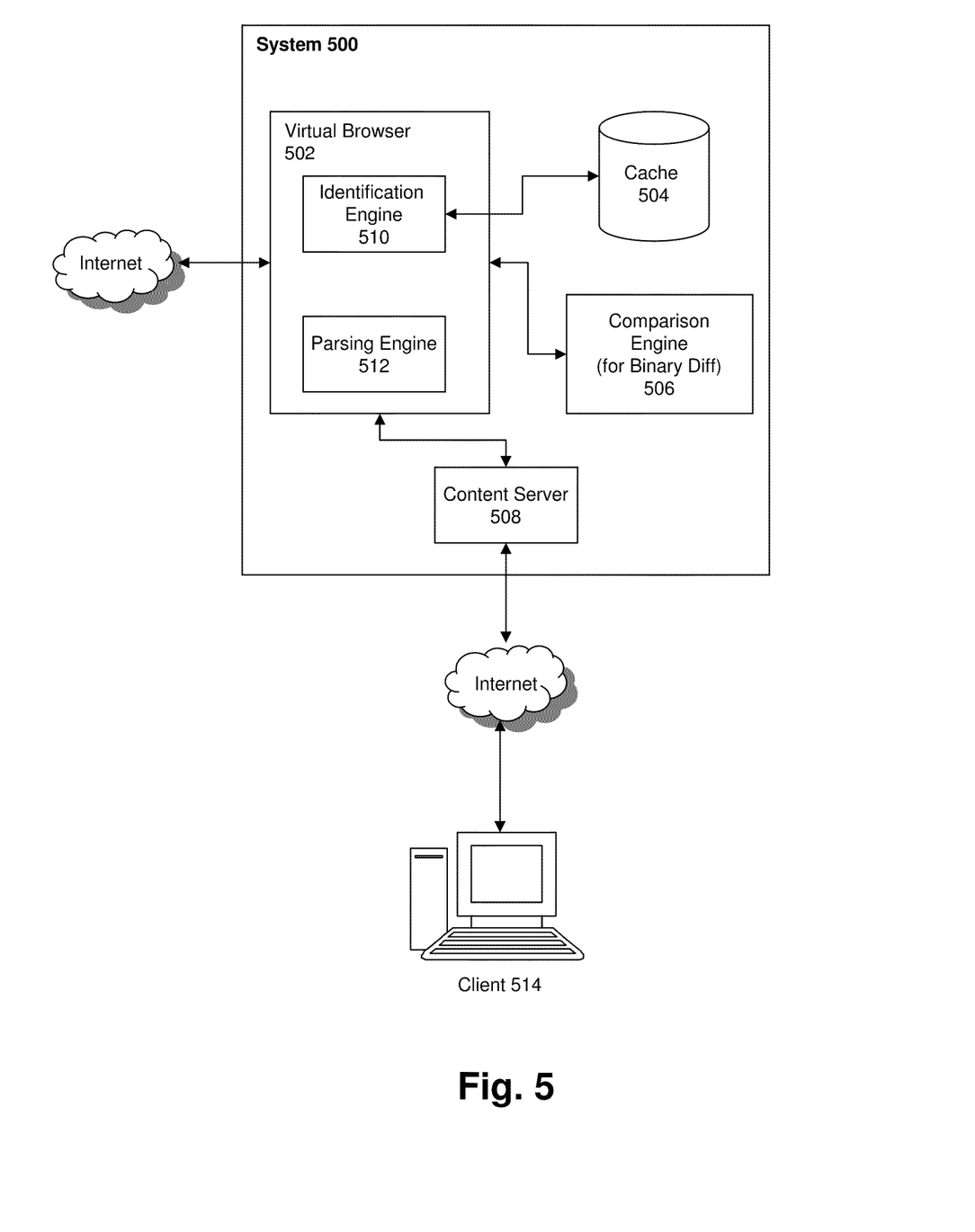
FIG. 5 is a block diagram of a preferred embodiment of a system in accordance with the present invention.

The present invention provides just such a solution. Referring now to FIG. 5, there is shown a block diagram of a preferred embodiment of a system in accordance with the present invention. System 500 comprises one or more virtual browsers 502, a cache 504, a comparison engine 506, a content server 508, and a token master 516. Virtual browser 502 additionally comprises an identification engine 510 and a parsing engine 512. Also shown in FIG. 5 is a client computer 514. A derivative service provider 100 may in practice have more than one system 500 in place depending on the capabilities of the hardware used by the provider 100 and the number of client computers 514 and web servers 104 that must be accessed simultaneously. The connection between client computer 514 and system 500 is via the Internet in a preferred embodiment, but may be by direct dial-up, LAN or other network.

When the client 514 attempts to access the DSP 100 service provided by system 500, content server 508 determines which web pages must be accessed on corresponding primary web servers 104 in order to build a content page (or pages) 108 to give to the user. One or more virtual browsers 502 are then assigned to retrieve the content (HTML or other content formats) from the primary web servers 104.

When a page is retrieved by the virtual browser 502, it is identified by the identification engine 510. The identification engine 510 determines whether the identified content object is one that is currently being tracked. If the identification engine 510 determines that the content object is not one that is already being tracked, then the identification engine determines whether the object is one that should be tracked. If the object is not one that should be tracked, it is simply parsed by the parsing engine 512 and sent to the content server 508. If it is to be tracked, the object is stored in the cache 504 along with its associated AST formed by the parsing engine 512 in addition to being sent to the content server 508.

If the identification engine determines that the object is being tracked, then the currently retrieved object is a new version of the object. Accordingly, the comparison engine 506 identifies the differing content in the new version of the page, by comparing the new version with the original (stored) version. The parsing engine 512 then parses the differing content, which is then associated with the original static content and sent to the content server 508. When content server 508 receives content from the parsing engine 512, it uses the received content to form additional derivative services content for transmission to client computer 514.

The operation of system 500 is now considered in greater detail. A user of client computer 514 accesses system 500 in order to retrieve derivative services content. For example, the user may have set up an account with the DSP 100 that provides him with e-mail, stock quotes, weather and news, each from a different original service provider (e.g. primary web server 104), but presented on one page 108 by the DSP 100. To access the DSP 100, the user initiates a connection from the client computer 514 to the content server 508 of system 500 via the Internet. Once connected, the client computer 514 sends a request to system 500 to provide derivative services.

The content server 508 determines which web servers 104 contain content that must be assembled and supplied to the client computer 514. The content server 508 then sends one or more requests to the virtual browser 502 for a content object (a page). Note that while in a preferred embodiment, the requested object is an HTML object, in alternative embodiments the item to be retrieved could be MIME-encoded email messages, XML pages, or other structured content.

The virtual browser 502 retrieves the requested page, and asks the identification engine 510 to identify it. Identification engine 510 attempts to identify the page according to rules stored in the identification engine 510. For example, suppose that the page is CNNfn's stock quote page. A URL on that page is of the form "http://qs.cnnfn.cnn.com/tq/stockquote?symbols=MSFT",
where "MSFT" is the symbol for the stock price being looked up. If a different quote, e.g. "AAP" were retrieved, the URL might be
"http://qs.cnnfn.cnn.com/tq/stockquote?symbols=AAPL".
Thus, the identification engine might store a rule that identifies URLs containing the string "http://qs.cnnfn.cnn.com/tq/stockquote?symbols=" or perhaps even "http://qs.cnnfn.cnn.com/tq/stockquote?" as an appropriate key for identifying the page.

While in a preferred embodiment, the rules stored in the identification engine 510 for identifying keys are entered manually, alternative embodiments allow the identification engine 510 to automatically select keys by analyzing similar patterns of URLs seen over periods of time. For example, in the example above, if a URL is seen repeatedly by the identification engine with only small changes each time, e.g. "MSFT" replaced by "AAPL" or "IBM", the identification engine 510 extracts the non-changing portion of the URL and forms a key from it. In addition to URLs, keys may include identification codes embedded in each page, or other indicia.

After a page has been identified, the identification engine 510 determines whether the page is already being tracked by system 500. This is done by maintaining a list of pages (indexed by key) in the cache 504. In other embodiments, the token master 516 maintains a table of keys that are being stored.

If the page is not already being tracked, then the identification engine 510 determines whether tracking should be initiated. Ideally, the best page candidates for tracking by system 500 are those that contain a mix of static and dynamic content. These pages should not be cached and reused in their entirety, because some data changes each time the page is retrieved. However, as in the stock quote example above, since much of the page remains constant each time, it would be wasteful to reparse the entire page 200. These characteristics make mixed pages (i.e. pages containing both dynamic and static content) well suited for tracking by system 500.

In a preferred embodiment, the virtual browser 502 accesses a rule database, which comprises a list of pages or keys that should be tracked. If the key for the page currently being retrieved matches a key listed in the rule database, then the page is tracked. In other embodiments, the identification engine 510 determines over time whether the page is suitable for tracking. Each new page (i.e. one not recognized by the identification engine 510) is initially tracked by default. If after the page has been seen a certain number of times, e.g. five, no static content can be identified, the page is no longer tracked. In addition, if the page is not seen again within a specified period, measured in either time or volume of pages retrieved, the page is expunged from the cache 504 and no longer tracked.

Figure 6:
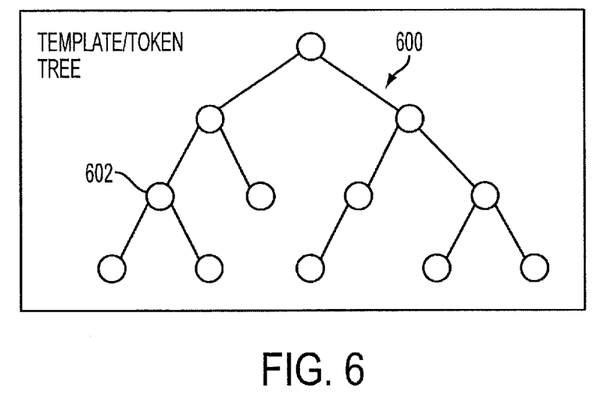
FIG. 6 is an illustration of static nodes of an abstract syntax tree in accordance with the present invention.

Referring now to FIG. 6, once it is determined that the page should be newly tracked, it is parsed by the parsing engine 512. As the page is parsed, a template/token tree 600 is built. A template/token tree is an AST modified to contain nodes and tokens. Each node of the tree 600 is initially labeled as a static node, indicating that the content stored in that node is to be treated by system 500 as static content. Node 602 is a typical static node of template/token tree 600. Once the HTML has been parsed and the template/token tree 600 built, the page and tree 600 are stored in the cache 504 until a version of the page is again retrieved by the virtual browser 502.

If the virtual browser 502 determines, on the other hand, that the page is already stored in the cache 504, the page and its associated template/token tree are loaded from the cache. System 500 does not need to parse the entire new page version, so long as it contains at least some text that is identical to the cached copy. (Note that in this description, the "version" of a page refers to the specific page as it appeared on the particular occasion on which it was retrieved. That is, if a page is retrieved at time $t_0$ and then retrieved again at some new time $t_1$, two versions of the page have been retrieved.) In order to determine how much of the new page version to parse, comparison engine 506 examines the different versions of the page. In a preferred embodiment, the newly retrieved version of the page and the cached copy of the page are compared using a binary "diff" algorithm, which identifies the differences between the binary representation of two documents. Binary diff is used in a preferred embodiment in part because its execution time is fast compared to the speed of having to parse HTML. In other embodiments, other comparison techniques may be used, with the caveat that comparisons that take increasingly longer to make will result in decreasing performance advantages over total parsing.

Figure 7:
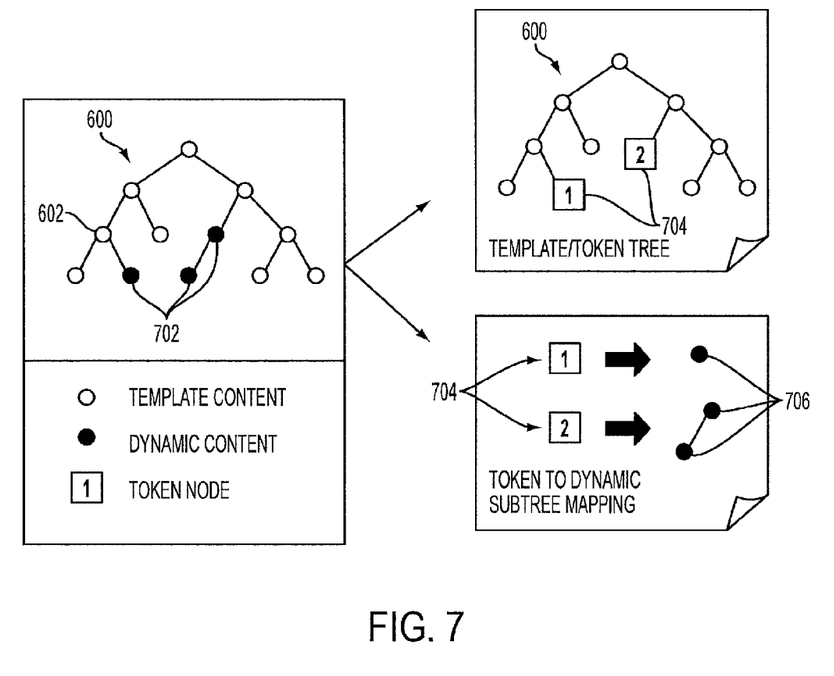
FIG. 7 is an illustration of an abstract syntax tree containing static and dynamic nodes in accordance with the present invention.

Once the comparison engine 506 determines which content varies between versions of the page, i.e. between the cached version and the newly retrieved version, the template/token tree associated with the page is updated so that nodes containing the different text are replaced in the tree by tokens 704. Tokens are requested from and assigned by the token master 516, and contain a unique ID. The virtual browser 502 forms subtrees from the nodes containing dynamic text, and additionally maintains a mapping from each token to its associated subtree. Referring now to FIG. 7, there is shown an illustration of a template/token tree having nodes that contain static content (static nodes) 602 and nodes that contain dynamic content (dynamic nodes) 702. The dynamic nodes 702 of the template/token tree are replaced by tokens 704, which are mapped by the virtual browser 502 to one or more subtrees 706 containing the dynamic nodes.

Once system 500 replaces the dynamic content with tokens 704, content corresponding to the static nodes 602 of the template/token tree need not be reparsed each time a new version of the page is retrieved. Instead, only dynamic content is parsed. The tokens of the template/token tree are mapped by the virtual browser 502 to the subtrees containing the dynamic content associated with the newly retrieved version of the page. Since system 500 in a preferred embodiment contains a large number of virtual browsers 502 operating currently to serve multiple users, each virtual browser 502 is responsible for maintaining its own mapping of tokens to dynamic subtrees. Thus, when a token/template tree 600 is retrieved from the cache by a virtual browser, it comprises static nodes and tokens with unique identifiers. As the virtual browser retrieves and parses dynamic content, it builds dynamic subtrees and associates each unique token identifier with a mapping to a specific subtree. This mapping remains, in a preferred embodiment, for as long as the virtual browser 502 has a connection open to the primary web server 104 associated with the dynamic subtree. If, in the course of identifying non-matching content, the comparison engine 506 determines that one of the template/token tree's static nodes actually contains dynamic content, the comparison engine requests a new token from the token master 516. This token replaces the dynamic node in the template/token tree, and the virtual browser creates a mapping from the new token to a subtree containing the associated dynamic content. When the virtual browser returns the template/token tree to the cache 504, it will contain the new token assigned by the token master 516. In this way, dynamic content is not cached once it is identified as dynamic, which results in lower storage space requirements, and additionally avoids data that may be sensitive, such as a user's password or financial information.

Note that if any portion of a node contains dynamic information then the entire text corresponding to that node is reparsed. For example, using the stock lookup page 200 of FIG. 2, suppose the ticker symbol being looked up in the first version is "MSFT." Then suppose that in the second version, a user has looked up the stock with ticker symbol "MOT." Since the binary diff algorithm only reports text that is different between versions of the page, the "different" text will be "OT" in the new version of the page, instead of "MOT," since both "MSFT" and "MOT" begin with the letter "M." However, since the stock ticker symbol is part of node 306, the entire node will be reparsed.

Figure 8:
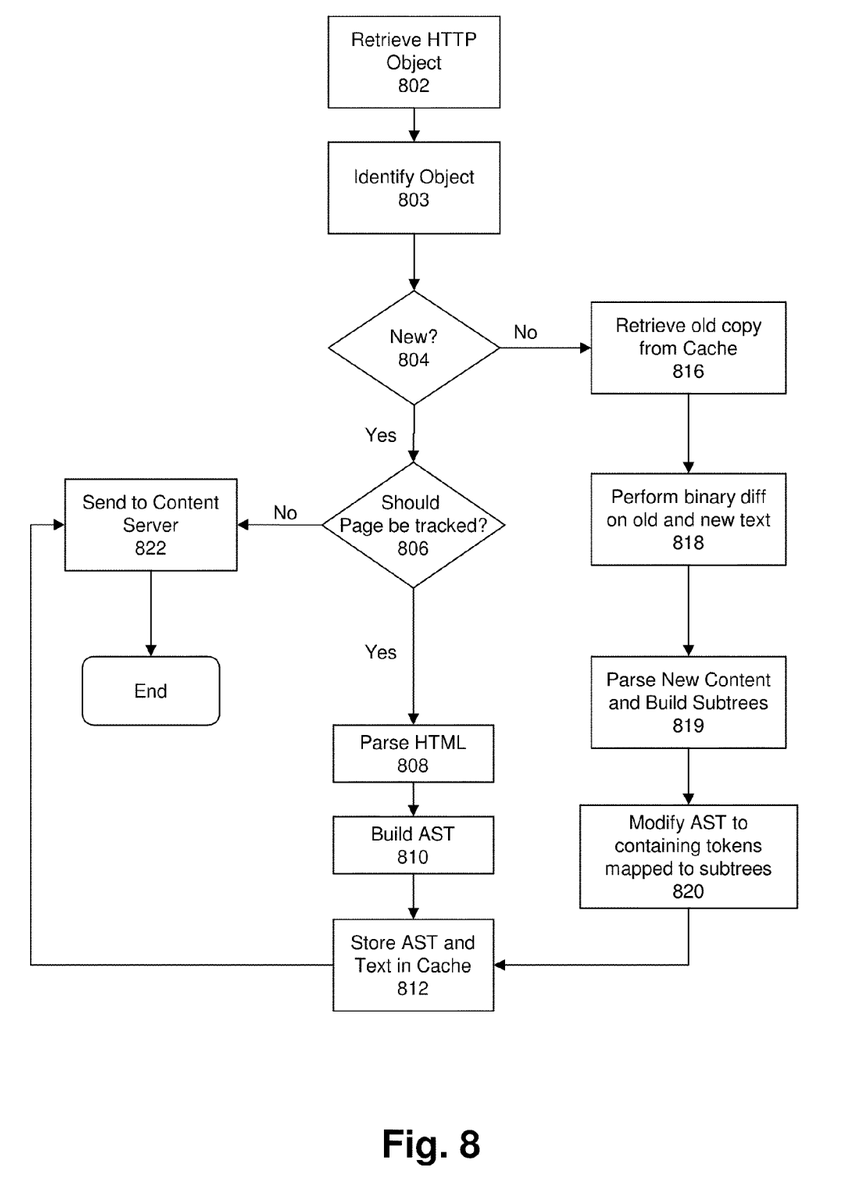
FIG. 8 is a flowchart of the operation of a preferred embodiment of the present invention.

Referring now to FIG. 8, there is shown a flow chart of the operation of a preferred embodiment of the system. To begin, system 500 receives 901 a request for an HTML object. System 500 then retrieves 802 the requested HTML object, e.g. via HTTP. System 500 identifies 803 the object and determines 804 whether the object has been previously stored in the cache. If the object is new, system 500 determines 806 whether the object is one that should be tracked by the system 500. If the object is not one that should be tracked, it is sent 822 to the content server 508. If the object is to be tracked, then it is sent to the parsing engine to be parsed 808. As the object is parsed, a corresponding template/token tree is built 810, and each node in the tree is initially designated as containing static content. The tree and the associated HTML object are then stored 812 in the cache. The parsed object is then sent 822 to the content server 508 where it is assembled for presentation to an end user as derivative content.

When system 500 retrieves 802 an HTML object that is determined 804 to be one that has been previously encountered and stored, a previous edition of the text and template/token tree are retrieved 816 from the cache 504. The text of the new HTML object is then compared 818 to the cached version. Content of the new object which differs from the cached version is then parsed 819. The template/token tree 600 is then updated 820 to comprise static nodes 602, which correspond to text not found to differ between objects, and unique tokens assigned by the token master 516 replacing content that does differ between objects. The updated template/token tree and most recent version of the HTML object are then returned 820 to the cache 504.

Consideration should also be given to the realization that web sites occasionally change the underlying templates. System 500 therefore monitors the ratio of static to dynamic content in the each page document being tracked. If the ratio of static to dynamic content in a page changes drastically, e.g. if the amount of dynamic content is suddenly found to have doubled, the underlying template may have changed and system 500 simply flushes the HTML document from the cache and restarts the iterative template-building process.

As will be understood by those familiar with the art, the invention may be embodied in other specific forms without departing from the spirit or essential characteristics thereof. For example, although the focus here is on generating template/token trees from HTML pages, those of skill in the art will recognize that system 500 can be extrapolated to effectively parsing many kinds of serialized structured content. Likewise, the particular modules, engines, protocols, features, attributes, data structures, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed:

1. A method for efficiently identifying dynamic content of a webpage, the method comprising:
   (a) accessing, by a virtual browser of a plurality of virtual browsers executing on a device intermediary to a plurality of clients and a plurality of servers a first stored data file representing a first version of a web page and a first abstract syntax tree corresponding to the first stored data file, the abstract syntax tree comprising at least one static node, the static node including stored content;
   (b) identifying, by the virtual browser of the plurality of virtual browsers, non-matching dynamic content between the first stored data file and a second data file representing a second version of the web page without using a second abstract syntax tree corresponding to the second data file; and
   (c) replacing, by the virtual browser, the at least one static node corresponding to the non-matching dynamic content in the first abstract syntax tree with a token that identifies the portion of the abstract syntax tree containing the non-matching dynamic content.

2. The method of claim 1, wherein step (b) further comprises receiving, by the device, the second version of the web page from a server.

3. The method of claim 1, wherein step (b) further comprises determining, by the virtual browser, which portions of the second version of the web page are dynamic.

4. The method of claim 3, further comprising parsing only those portions of the second version of the web page that are dynamic.

5. The method of claim 1, wherein step (c) further comprises obtaining, by the virtual browser, a unique token identifier for the token added to the first abstract syntax tree.

6. The method of claim 5, further comprising maintaining, by the virtual browser, a mapping of the token to an associated subtree of the first abstract syntax tree.

7. The method of claim 6, further comprising constructing, by the virtual browser, a dynamic subtree representing non-matching dynamic content and associating the dynamic subtree with the unique token identifier.

8. The method of claim 7, further comprising maintaining, by the virtual browser, the association between the dynamic subtree with the unique token identifier until termination of the connection between one of the plurality of servers and the virtual browser.

9. The method of claim 1, further comprising: (d) tracking, by the virtual browser, a ratio of static nodes to tokens for the tracked web page; (e) deleting, by the virtual browser, the first abstract syntax tree if the ratio of static nodes to tokens exceeds a threshold; and (f) building, by the virtual browser, a new abstract syntax tree.

10. The method of claim 1, wherein step (c) further comprising storing, by the virtual browser, the first abstract syntax tree.

11. A system for efficiently identifying dynamic content of a webpage comprising:
   a device intermediary to a plurality of clients and a plurality of servers;
   a comparison engine of the device:
      accessing a first stored data file representing a first version of a web page and first abstract syntax tree corresponding to the first stored data file, the abstract syntax tree comprising at least one static node, the static node including stored content; and
      identifying non-matching dynamic content between the first stored data file and a second data file representing a second version of the web page without using a second abstract syntax tree corresponding to the second data file; and
   a virtual browser of a plurality of virtual browsers executing on the device and replacing the at least one static node corresponding to the non-matching dynamic content in the first abstract syntax tree with a token that identifies the portion of the abstract syntax tree containing the non-matching dynamic content.

12. The system of claim 11, wherein the device receives the second version of the web page from a server.

13. The system of claim 11, wherein the virtual browser determines which portions of the second version of the web page are dynamic.

14. The system of claim 13, wherein the virtual browser parses only those portions of the second version of the web page that are dynamic.

15. The system of claim 11, wherein the virtual browser obtains a unique token identifier for the token added to the first abstract syntax tree.

16. The system of claim 15, wherein the virtual browser maintains a mapping of the token to an associated subtree of the first abstract syntax tree.

17. The system of claim 16, wherein the virtual browser constructs a dynamic subtree representing non-matching dynamic content and associating the dynamic subtree with the unique token identifier.

18. The system of claim 17, wherein the virtual browser maintains the association between the dynamic subtree with the unique token identifier until termination of the connection between one of the plurality of servers and the virtual browser.

19. The system of claim 11, wherein the virtual browser tracks a ratio of static nodes to tokens for the tracked web page; deletes the first abstract syntax tree if the ratio of static nodes to tokens exceeds a threshold; and builds a new abstract syntax tree.

20. The system of claim 11, wherein the virtual browser stores the first abstract syntax tree.

\* \* \* \* \*